(12) United States Patent
Zhang et al.

(10) Patent No.: US 10,031,743 B2
(45) Date of Patent: Jul. 24, 2018

(54) METHOD AND APPARATUS FOR KERNEL REPAIR AND PATCHING

(71) Applicant: Baidu Online Network Technology (Beijing) Co., Ltd., Beijing (CN)

(72) Inventors: Yulong Zhang, Beijing (CN); Chenfu Bao, Beijing (CN); Tao Wei, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/279,958

(22) Filed: Sep. 29, 2016

(65) Prior Publication Data
US 2017/0344361 A1    Nov. 30, 2017

(30) Foreign Application Priority Data

May 24, 2016  (CN) .......................... 2016 1 0350050

(51) Int. Cl.
| | | |
|---|---|---|
| G06F 9/44 | (2018.01) | |
| G06F 8/654 | (2018.01) | |
| G06F 9/445 | (2018.01) | |
| H04L 29/08 | (2006.01) | |

(52) U.S. Cl.
CPC .............. *G06F 8/654* (2018.02); *G06F 8/665* (2013.01); *H04L 67/34* (2013.01)

(58) Field of Classification Search
CPC ................................. G06F 8/665; G06F 8/654
USPC .................................. 717/168–178; 709/203
See application file for complete search history.

(56) References Cited

U.S. PATENT DOCUMENTS

| | | | | | |
|---|---|---|---|---|---|
| 4,942,541 | A * | 7/1990 | Hoel | ...................... | G06K 15/00 345/545 |
| 5,813,043 | A * | 9/1998 | Iles | ........................ | G06F 9/328 711/102 |
| 6,161,218 | A * | 12/2000 | Taylor | ...................... | G06F 8/65 717/168 |
| 6,760,908 | B2 * | 7/2004 | Ren | ........................ | G06F 8/654 717/173 |
| 7,055,146 | B1 * | 5/2006 | Durr | ................... | G06F 9/44521 717/162 |

(Continued)

OTHER PUBLICATIONS

Marinescu et al, "KATCH: High-Coverage Testing of Software Patches", ACM, pp. 235-245, 2013.*

(Continued)

*Primary Examiner* — Anil Khatri
(74) *Attorney, Agent, or Firm* — Knobbe Martens Olson & Bear LLP

(57) ABSTRACT

This application discloses at least a kernel repair method and apparatus. An embodiment of the method includes: loading a patch for repairing a to-be-repaired object function in a kernel, the patch being written in a memory-safe language subset of a non-memory-safe language or a memory-safe language; executing the patch using a memory-safe language engine; receiving a call request for calling a repair interface to repair the object function during the executing of the patch, wherein the repair interface is an interface provided by the memory-safe language engine and used for repairing a function; and executing the requested repair interface to repair the object function. As such, the hot patching and security of a kernel can be achieved.

18 Claims, 5 Drawing Sheets

(56) References Cited

U.S. PATENT DOCUMENTS

| | | | |
|---|---|---|---|
| 7,191,436 B1* | 3/2007 | Durr | G06F 8/65 707/999.005 |
| 7,310,800 B2* | 12/2007 | Brouwer | G06F 8/66 711/103 |
| 7,603,668 B2* | 10/2009 | Zweifel | G06F 8/65 717/168 |
| 7,801,981 B2* | 9/2010 | Setogawa | H04L 12/2803 709/203 |
| 7,827,546 B1* | 11/2010 | Jones | G06F 8/65 717/168 |
| 7,865,888 B1* | 1/2011 | Qureshi | G06N 5/048 717/168 |
| 7,996,814 B1* | 8/2011 | Qureshi | G06N 5/048 717/100 |
| 8,104,087 B2* | 1/2012 | Quinn | G06F 11/0748 717/172 |
| 8,291,407 B2* | 10/2012 | Greenwood | G06F 8/67 717/168 |
| 8,824,784 B2* | 9/2014 | Tedesco | G06F 17/30256 382/103 |
| 8,935,687 B2* | 1/2015 | Faus | G06F 8/63 717/168 |
| 9,170,803 B2* | 10/2015 | Pavlik | G06F 8/67 |
| 9,772,928 B2* | 9/2017 | Bhandari | G06F 11/366 |

OTHER PUBLICATIONS

Calcagni et al, "Patchable Control Store for Reduced Microcode Risk in a VLSI VAX Microcomputer", IEEE, pp. 70-76, 1984.*
Cotroneo et al, "Towards Patching Memory Leak Bugs in Off-The-Shelf Software", IEEE, pp. 433-436, 2014.*
Yang et al, "Better Test Cases for Better Automated Program Repair", ACM, pp. 831-841, 2017.*
Wagner et al, "CASPAR: Hardware Patching for Multicore Processors ", ACM, pp. 658-663, 2009.*
Hu et al, "Fast Image Rearrangement via Multi-Scale Patch Copying ", ACM, pp. 691-694, 2010.*
Qi et al, "An Analysis of Patch Plausibility and Correctness for Generate-and-Validate Patch Generation Systems ", ACM, pp. 24-36, 2015.*

* cited by examiner

METHOD AND APPARATUS FOR KERNEL REPAIR AND PATCHING

CROSS-REFERENCE TO RELATED APPLICATIONS

This application is related to and claims priority from Chinese Application No. 201610350050.1, filed on May 24, 2016, entitled "KERNEL REPAIR METHOD AND APPARATUS," the entire disclosure of which is hereby incorporated by reference.

TECHNICAL FIELD

This application relates to the technical field of computers, specifically relates to the field of information security, and particularly relates to a kernel repair method and apparatus.

BACKGROUND

Kernel vulnerability is a technical problem faced by all Android devices. At present, although a large number of kernel vulnerabilities have been made public, there remain numerous Android devices which cannot be updated in time. Shadow industries can utilize these vulnerabilities to break through nearly all security protection mechanisms installed in the devices such as encryption, fingerprint, and data compartmentalization. Since mobile phone manufacturers cannot concentrate their effort to find and repair kernel vulnerabilities as third-party manufacturers specialising in security do, it is difficult to solve this problem by only relying on mobile phone manufacturers. In addition, as the Android supply chain is very long, it is often too late when the kernel patch is able to reach user equipment after passing a series of audits. Therefore, the manufacturers specialising in security need to collaborate with other manufacturers along the supply chain.

However, it is difficult for the security manufacturers to obtain device source code, and to provide customization on thousands of devices on the market. Therefore, there is an acute need for a flexible mechanism to allow the security manufacturers to insert repair logics independent of the platforms. In addition, flexibility means risk, so a restraint mechanism to limit the repair capability of the security manufacturers is needed to prevent arbitrarily tampering with the kernel logic, or even a back door insertion.

SUMMARY

One of the objectives of this application is to provide an improved kernel repair method and apparatus, to solve the technical problem mentioned in the BACKGROUND.

In a first aspect, this application provides a kernel repair method comprising: loading a patch for repairing a to-be-repaired object function in a kernel, the patch being written in a memory-safe language subset of a non-memory-safe language or a memory-safe language; executing the patch using a memory-safe language engine; receiving a call request for calling a repair interface to repair the object function during the executing of the patch, wherein the repair interface is an interface provided by the memory-safe language engine and used for repairing a function; and executing the requested repair interface to repair the object function.

In some embodiments, the executing the requested repair interface to repair the object function comprises: inserting a call to a check function provided by the patch at an initialization position of the object function, the check function being used for checking whether an entrance parameter of a function is abnormal.

In some embodiments, the executing the requested repair interface to repair the object function comprises: for a function called by the object function, inserting a call to a check function provided by the patch at an initialization position of the function, the check function being used for checking whether an execution state and/or an entrance parameter of the function is abnormal.

In some embodiments, the executing the requested repair interface to repair the object function comprises: for a function called by the object function, inserting a call to a check function provided by the patch at a position before a return instruction in the function, the check function being used for checking whether an execution state is abnormal.

In some embodiments, before inserting the call to the check function provided by the patch, the executing the requested repair interface to repair the object function further comprises: determining that the function called by the object function is a function having an execution result state as a return value.

In some embodiments, before the loading a patch for repairing a to-be-repaired object function in a kernel, the method further comprises: conducting a signature verification on the patch to determine a validity of the patch.

In a second aspect, this application provides a kernel repair apparatus comprising: a loading unit configured to load a patch for repairing a to-be-repaired object function in a kernel, the patch being written in a memory-safe language subset of a non-memory-safe language or a memory-safe language; an execution unit configured to execute the patch using a memory-safe language engine; a receiving unit configured to receive a call request for calling a repair interface to repair the object function during the executing of the patch, wherein the repair interface is an interface provided by the memory-safe language engine and used for repairing a function; and a repair unit configured to execute the requested repair interface to repair the object function.

In some embodiments, the repair unit is further configured to insert a call to a check function provided by the patch at an initialization position of the object function, the check function being used for checking whether an entrance parameter of a function is abnormal.

In some embodiments, the repair unit is further configured to: for a function called by the object function, insert a call to a check function provided by the patch at an initialization position of the function, the check function being used for checking whether an execution state and/or an entrance parameter of the function is abnormal.

In some embodiments, the repair unit is further configured to: for a function called by the object function, insert a call to a check function provided by the patch at a position before a return instruction in the function, the check function being used for checking whether an execution state is abnormal.

In some embodiments, the repair unit is further configured to: determine that the function called by the object function is a function having an execution result state as a return value before inserting the call of the check function provided by the patch.

In some embodiments, the apparatus further comprises: a verification unit configured to conduct a signature verification on the patch to determine a validity of the patch before loading the patch for repairing the to-be-repaired object function in the kernel.

By means of the kernel repair method and apparatus provided in this application, a memory-safe language engine executes a patch written in a memory-safe language subset of a non-memory-safe language or a memory-safe language, and the patch executes corresponding repair by calling a repair interface provided by the memory-safe language engine, so that patches for repairing kernel vulnerabilities can be developed by third-party security manufacturers with by means of repair interfaces without considering the problem of adaptation. Meanwhile, the method also limits the authority during the execution of the patch as much as possible, to prevent illegal personnel from executing the patch to arbitrarily tamper kernel logic and even insert back orifice, thereby achieving the security of kernel repair.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application is further described in detail through the accompanying drawing and the embodiment. It should be understood that, the specific embodiments described herein are merely used to explain the relevant disclosure, and are not intended to limit the present disclosure. In addition, it should be further noted that, in order to facilitate the description, merely the parts related to the relevant disclosure are shown in the accompanying drawings.

It should be noted that, the embodiments of the present application and features in the embodiments may be combined on a non-conflict basis. The present application will be described in detail through the accompanying drawings and the embodiments.

Figure 1:
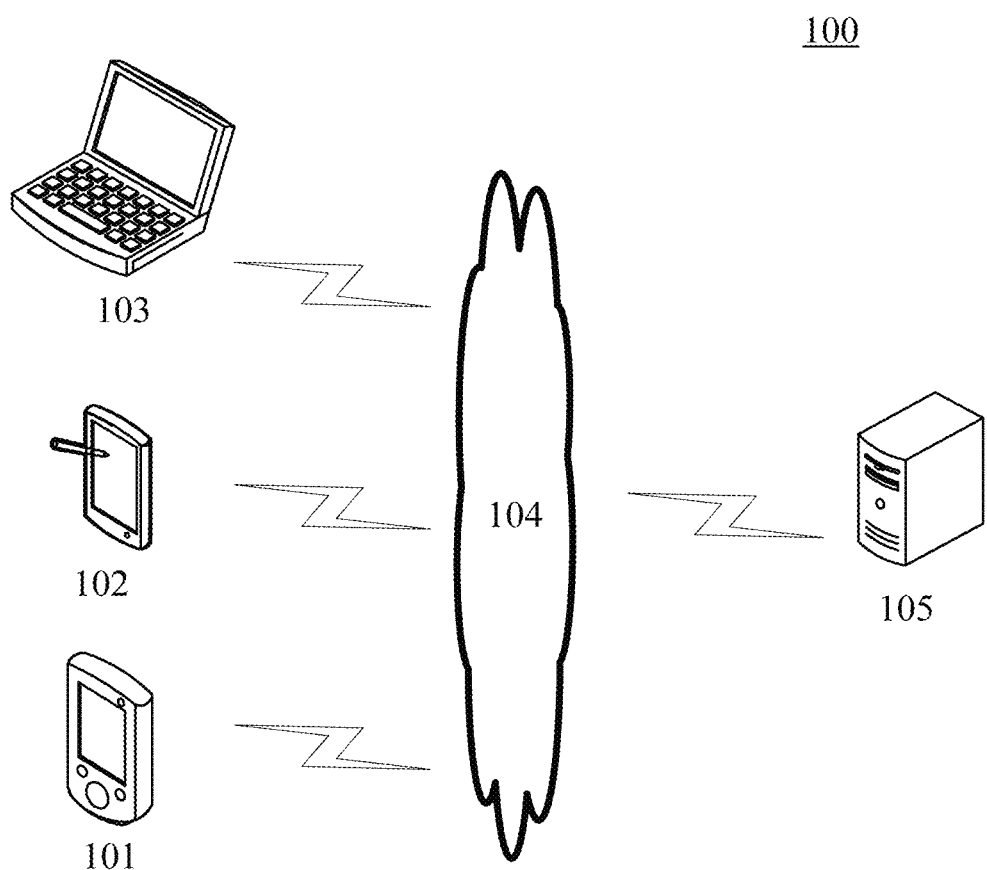
FIG. 1 is a diagram of a system architecture to which this application can be applied.

FIG. 1 shows a system architecture 100 of an embodiment to which the kernel repair method or kernel repair apparatus of this application can be applied.

As shown in FIG. 1, the system architecture 100 may comprise terminal devices 101, 102, 103, a network 104 and a server 105. The network 104 is used for providing a communication link medium between the terminal devices 101, 102, 103 and the server 105. The network 104 may comprise various connection types, for example, wired and wireless communication links or optical fiber cables and the like.

A user can use the terminal devices 101, 102, 103 to interact with the server 105 through the network 104, so as to receive or send messages and the like. The terminal device 101, 102, 103 may be provided thereon with various communication client applications, such as a webpage browser application, a shopping-type application, a search-type application, an instant messaging tool, a mailbox client, social platform software and the like.

The terminal devices 101, 102, 103 may be various electronic devices with operating systems, including but not limited to a smart cellphone, a tablet computer, an ebook reader, an MP3 (Moving Picture Experts Group Audio Layer III) player, an MP4 (Moving Picture Experts Group Audio Layer IV) player, a laptop computer, a desktop computer and the like. The above-mentioned operating systems including but not limited to Android operating system and Linux operating system.

The server 105 may be a server (such as a patch server which provides support for kernel patches loaded on the terminal devices 101, 102, 103) which provides various services. The patch server can distribute corresponding patches to the terminal devices 101, 102, 103 in response to patch acquisition requests sent by the terminal devices 101, 102, 103.

It is important to note that the kernel repair method provided in embodiments of this application is executed by the terminal devices 101, 102, 103 in general, and accordingly, the kernel repair apparatus is arranged in the terminal devices 101, 102, 103 in general.

It should be understood that the number of terminal device(s), network(s) and server(s) in FIG. 1 is only illustrative. There may be any number of terminal device(s), network(s) and server(s) according to implementation needs.

Figure 2:
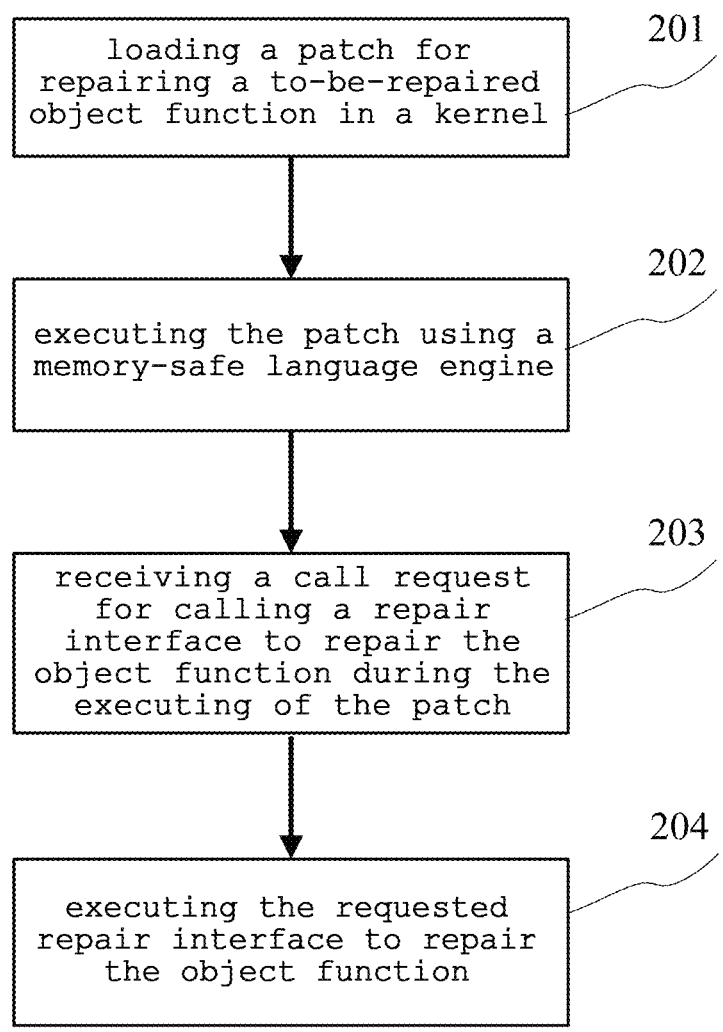
FIG. 2 is a flow chart of a kernel repair method according to one embodiment of this application.

Referring to FIG. 2, it shows a flowchart 200 of a kernel repair method according to one embodiment of the application. The kernel repair method comprises the following steps.

Step 201, loading a patch for repairing an object function to be repaired in a kernel.

In this embodiment, an electronic device with the kernel repair method operating thereon (such as the terminal device shown in FIG. 1) may load the patch for repairing the object function to be repaired in the kernel when a kernel repair operation request is received. The patch may be pre-stored locally in the terminal device, or acquired from the server through a wired or wireless connection. The above-mentioned kernel may generally be a kernel in various operating systems, such as the Linux system.

A kernel hot patching framework for executing various functions on the patch may be pre-implanted in the operating system kernel of the electronic device. The approaches to implant the kernel hot patching framework include, but not limited to, utilizing an existing kernel bug, through pre-installation by the mobile phone manufacturer or dynamic loading. The functions executed on the patch by the hot patching framework include, but are not limited to: loading, execution, stopping, unloading, running state monitoring, executing log recording or restriction policy controlling.

It should be note that the above-mentioned patch may be written in a memory-safe language subset of a non-memory-safe language or a memory-safe language. The memory-safe language subset of the non-memory-safe language or the memory-safe language may be languages which can avoid various memory errors including but not limited to: array out-of-bound, buffer overflow, referring null pointer, using uninitialized memory, using or releasing released, invalid or unallocated pointers, attempting to allocate more memory when the stack is depleted and allocating excess memory when the stack space is insufficient.

Step 202, executing the patch using a memory-safe language engine.

In this embodiment, a memory-safe language engine is arranged in a kernel of an electronic device, the memory-safe language engine may be used for interpreting, executing or compiling codes written in the memory-safe language or the memory-safe language subset of the non-memory-safe language. When the memory-safe language engine executes the code written in the memory-safe language or the memory-safe language subset of the non-memory-safe language, the ability of the code may be limited within a preset range, thereby reducing security risks. The above-mentioned memory-safe language engine may include, but not limited to, language engines such as Lua, Luajit. The memory-safe language engine may be used as a module of the above-mentioned hot patching framework. After the patch is loaded in step 201, the electronic device can execute the patch through the memory-safe language engine in the kernel.

Optionally, Lua may be selected as the above-mentioned memory-safe language engine. The Lua language is concise and lightweight. The code written in Lua is easy to interchange with C/C++ language and is suitable for being integrated in the kernel. In addition, a Lua virtual machine can also limit the execution of a patch code, so that the patch code is only allowed to call a C interface provided by the Lua engine, thereby preventing the threats of bug, back door, and attacking logic.

Step 203, receiving a call request for calling a repair interface to repair the object function during the process of executing the patch.

In this embodiment, the above-mentioned memory-safe language engine provides repair interfaces. These repair interfaces may be called by external programs to implement a functionality to repair a function in the kernel. Optionally, these repair interfaces may be maintained through the restriction policy control function of the above-mentioned hot patching framework. The above-mentioned patch comprises code for calling a repair interface. Therefore, when the patch is executed, a call request for calling the repair interface may be initiated, so that the memory-safe language engine of the electronic device may receive the call request. Generally, internal implementations of the repair interfaces have the permissions of operating assembly instructions in the functions in the kernel. These internal implementations are encapsulated into capability interfaces to be provided to the public. The code in the patch can only call these capability interfaces, and cannot directly conducted immediate operation on the functions in the kernel, thereby implementing the permission control of the patch.

Step 204, executing the requested repair interface to repair the object function.

In this embodiment, based on the call request for calling a repair interface which is received in step 203, the memory-safe language engine of the electronic device may repair the object function by executing the requested repair interface. Executing the repair interface means that a functional implementation corresponding to the repair interface is executed. The specific content of the functional implementation may include executing a preset operation on the object function to repair the object function. Optionally, the operation executed by the repair interface includes but is not limited to: inserting an assembly instruction or inserting a call for a function written in a memory-safe language at a designated position of the object function, modifying the assembly instruction at the designated position of the object function or replacing an original assembly instruction with the call of the function written in the memory-safe language, linking the preset call, and replacing the preset function.

In some optional implementations of this embodiment, when certain repair interfaces are executed in step 204, the execution may specifically be implemented using the following approaches: inserting a call of a check function provided in the patch at the initialization position of the object function, the check function may be used for checking whether an entrance parameter of the object function is abnormal. In this implementation, the above-mentioned patch written in the memory-safe language subset of the non-memory-safe language or the memory-safe language provides a check function used in the repair process, wherein the function name of the check function can be used as a parameter of the call request. Accordingly, the electronic device can determine a check function to be called according to the function name, thereby successfully inserting a call of a check function provided in the patch at the initialization position of the object function. When the repaired object function is executed, the check function can be called by a call-back mechanism. In general, when the check function is executed, a check result for characterizing the existence of exception can be generated, wherein the check result can be used for instructing whether to execute the subsequent process of the object function. The manner of determining whether to execute the subsequent process of the object function according to the check result may be implemented through various mechanisms. For example, the check function may be responsible for returning the check result to the object function, so that the sentences progressing in the check function can determine whether to execute the subsequent process of the object function by judging the check result. As another example, if the check result is determined to be abnormal, the check function may also directly jump from the object function to the function calling the object function, by calling the interface implemented in the memory-safe language and used for stopping function execution, and may also return the check result indicating exception to the calling function at the same time. The approaches to determine whether to execute the subsequent steps of the object function based on the check result are not limited to the ones listed above.

The implementation is illustrated by using the Lua memory-safe language engine as an example. When a repair interface achieves a kernel repair function, a call-back can be inserted at the entrance of the object function having a vulnerability as declared by the Lua patch. Once the repaired object function is executed at this position, the check function implemented by the Lua patch will be called, and parameters of the object function of the kernel will be forwarded to the check function. The check function may check the input parameters, and return the value of normality (for example, return 0) or abnormality (for example, return −1). If normal, the object function is executed as usual. Otherwise, the object function is stopped from being executed, and abnormality is returned to the caller of the object function. More specifically, the process of inserting the call of the check function may be implemented in the following manners. First, the entrance of the object function may be replaced with a jump instruction to jump to a jump function. The jump function is responsible for saving the field first after the jump, and the saved information includes but not limited to the register state, and the stack information. Then, the jump function calls the check function implemented in the Lua patch, and the entrance parameter of the object function is forwarded in during the calling. Thereafter, the jump function is responsible for restoring the field when the check function returns the check result. If the check result returned by the check function is normal, subsequent instructions of the object function is continued to be executed. Otherwise, the execution of the object function is interrupted.

In the implementation, a call to a check function for checking whether an input parameter of the object function is abnormal can be inserted at the initialization position of the object function by executing some repair interfaces. When the repaired object function is executed, the entrance parameter of the object function can be checked in time by using the check function, to prevent risks such as information leakage during the execution of the object function, which is caused by the abnormality of the entrance parameter of the object function, so as to repair the vulnerabilities.

In some implementations of this embodiment, some repair interfaces may be executed in step 204 as below. For a function called by the object function, a call to a check function provided by the patch is inserted at the initialization position of the function. The check function is used for checking whether an execution state and/or an entrance parameter of the function is abnormal.

Because the object function may also have a part with a vulnerability at other position, in addition to having the part with a vulnerability at the initialization position, especially in the process of calling other functions. For the called function, a security risk may occur in the subsequent process of the object function in general due to the fact that the entrance parameter at the entrance thereof or the execution state is abnormal. Therefore, the function of these repair interfaces may be inserting a call to a check function provided by the patch at the initialization position of the called function, thereby realizing a abnormality check on corresponding data. By means of the same method as in the above-mentioned implementation, whether to execute the subsequent process of the object function can be determined according to the check result generated by the check function, which will not be repeated herein in detail.

In some implementations of this embodiment, some repair interfaces may be executed in step 204 as below. For a function called by the object function, a call to a check function provided by the patch is inserted at the position before a return instruction in the function. The check function is used for checking whether an execution state is abnormal. Abnormality may also occur to the function called by the object function when the execution result is returned. Therefore, these repair interfaces may have the function of inserting a call to the check function provided by the patch at the position before a return instruction in the called function, thereby checking whether the execution state before the function is returned is abnormal when the repaired object function is executed, in order to prevent security risks.

In some alternative implementations of the above-mentioned two implementations, step 204 further comprises: determining that the function called by the object function is a function having an execution result state as a return value before inserting a call to a check function provided by the patch. In this embodiment, in various functions called by the object function, the object operated by the repair interface is limited to a function having an execution result state as the return value. Only for the function having an execution result state as the return value, the repair interface is allowed to insert a call to a check function provided by the patch. For a called function having an ordinary value as the return value, inserting a call to a check function in an external patch is not allowed, thereby preventing the code in the patch from causing the security risk in the kernel by operating the return value. Therefore, the implementation may further improve the security.

In the same way, the implementation is illustrated by using the Lua memory-safe language engine as an example. When some repair interfaces are executed, the call to the function having an execution result state as the return value may be hooked/replaced in the object function of the kernel with vulnerabilities as declared by the Lua patch, to call the check function implemented by the Lua patch at the entrance or before the return of the function to check the state thereof, and return the value, of normality (for example, return 0) or abnormality (for example, return −1). The return value may also be directly returned to the caller of the object function. The specific implementation is substantially consistent with the above-mentioned implementation, which will not be repeated herein in detail.

By means of the method provided in the embodiment of this application, a memory-safe language engine executes a patch written in a memory-safe language subset of a non-memory-safe language or a memory-safe language, and the patch executes corresponding repair by calling a repair interface provided by the memory-safe language engine, so that patches for repairing kernel vulnerabilities can be developed by third-party security manufacturers with by means of repair interfaces without considering the problem of adaptation. Meanwhile, the method also limits the authority during the execution of the patch as much as possible, to prevent illegal personnel from executing the patch to arbitrarily tamper kernel logic and even insert back orifice, thereby achieving the security of kernel repair.

Figure 3:
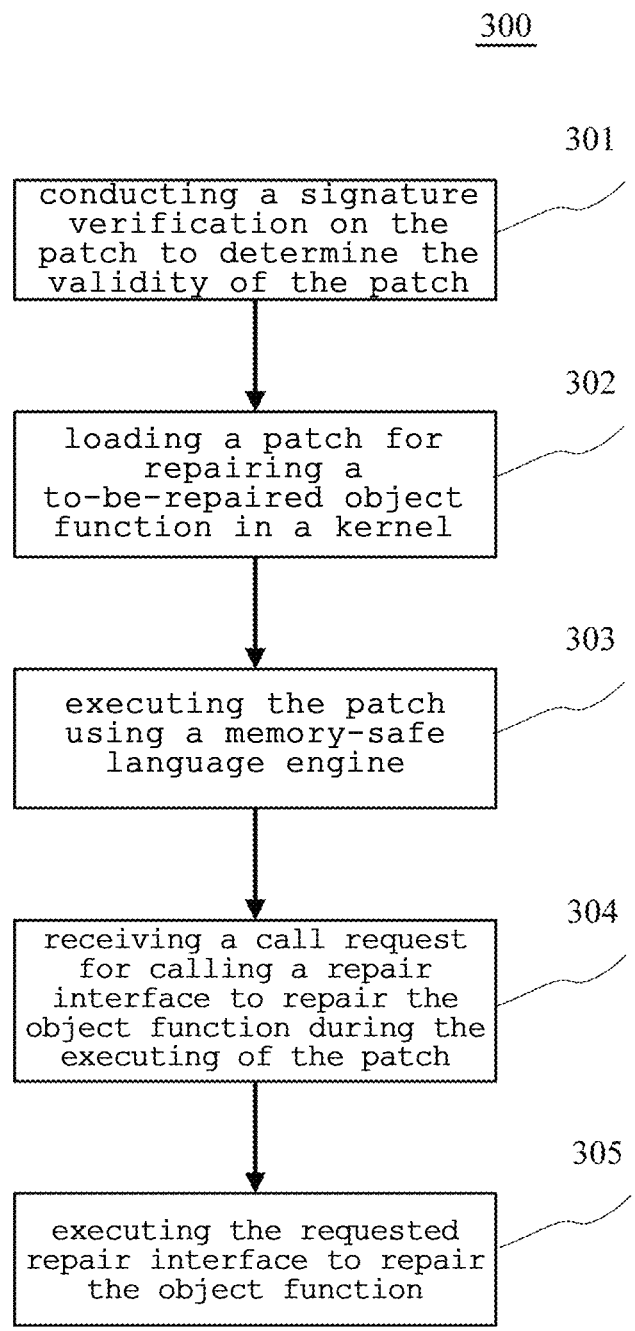
FIG. 3 is a flow chart of a kernel repair method according to another embodiment of this application.

Further referring to FIG. 3, it shows a process 300 of a kernel repair method of another embodiment. The process 300 of the kernel repair method comprises the following steps.

Step 301, conducting a signature verification on the patch to determine the validity of the patch.

In this embodiment, before loading a patch, the electronic device may conduct a signature verification on the patch first. The signature in the step is generally a digital signature, and the digital signature is some data added to a data unit or password transformation conducted on the data unit. Such data or transformation allows a receiver of the data unit to confirm the source of the data unit and the integrity of the data unit and to protect the data, in order to prevent counterfeit by a person (for example, the receiver). It is a method for signing electronic messages, and a signature message may be transmitted in one communication network.

By verifying the signature of the patch, the integrity and source reliability of the patch can be determined. Only after the verification is passed, subsequent steps can be executed. In case that the patch is not signed or is signed with an untrusted certificate, or the content of the patch is inconsistent with the signature, the verification will not be passed, so that the corresponding patch may be abandoned. By verifying the signature, it can be ensured that the subsequently loaded patches have validity.

Step 302, loading a patch for repairing a to-be-repaired object function in a kernel.

In this embodiment, the specific operation of step 302 may refer to step 201 in the embodiment corresponding to FIG. 2, which will not be repeated herein in detail.

Step 303, executing the patch using a memory-safe language engine.

In this embodiment, the specific operation of step 303 may refer to step 202 in the embodiment corresponding to FIG. 2, which will not be repeated herein in detail.

Step 304, receiving a call request for calling the repair interface to repair the object function in the process of executing the patch.

In this embodiment, the specific operation of step 304 may refer to step 203 in the embodiment corresponding to FIG. 2, which will not be repeated herein in detail.

Step 305, executing the requested repair interface to repair the object function.

In this embodiment, the specific operation of step 305 may refer to step 204 in the embodiment corresponding to FIG. 2, which will not be repeated herein in detail.

It can be seen from FIG. 3 that, compared with the embodiment corresponding to FIG. 2, the process 300 of the kernel repair method in this embodiment emphasizes the signature verification on the patch, thereby ensuring that the subsequently loaded and executed patches have validity, and further reducing potential safety hazards.

Figure 4:
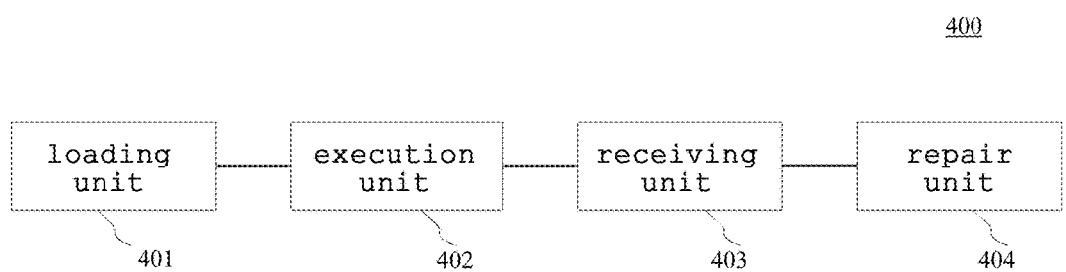
FIG. 4 is a structural diagram of a kernel repair apparatus according to one embodiment of this application.

Further referring to FIG. 4, for implementing the methods shown in the above-mentioned figures, an embodiment of the application provides a kernel repair apparatus. The apparatus of this embodiment corresponds to the method of the embodiment shown in FIG. 2. The apparatus may be applied to various electronic devices.

As shown in FIG. 4, the kernel repair apparatus 400 of this embodiment comprises: a loading unit 401, an execution unit 402, a receiving unit 403 and a repair unit 404, wherein the loading unit 401 is configured to load a patch for repairing a to-be-repaired object function in a kernel, the patch being written in a memory-safe language subset of a non-memory-safe language or a memory-safe language; the execution unit 402 is configured to execute the patch using a memory-safe language engine; the receiving unit 403 is configured to receive a call request for calling a repair interface to repair the object function during the executing of the patch, wherein the repair interface is an interface provided by the memory-safe language engine and used for repairing a function; and the repair unit 404 is configured to execute the requested repair interface to repair the object function.

In this embodiment, the specific operations of the loading unit 401, the execution unit 402, the receiving unit 403 and the repair unit 404 of the kernel repair apparatus 400 may refer to the implementation corresponding to FIG. 2, which will not be repeated herein in detail.

In some optional implementations of this embodiment, the repair unit 404 is further configured to insert a call to a check function provided by the patch at an initialization position of the object function, the check function being used for checking whether an entrance parameter of a function is abnormal. The specific operation of the implementation may refer to the implementation corresponding to the embodiment of FIG. 2, which will not be repeated herein in detail.

In some optional implementations of this embodiment, the repair unit 404 is further configured to: for a function called by the object function, insert a call to a check function provided by the patch at an initialization position of the function, the check function being used for checking whether an execution state and/or an entrance parameter of the function is abnormal. The specific operation of the implementation may refer to the implementation corresponding to the embodiment of FIG. 2, which will not be repeated herein in detail.

In some optional implementations of this embodiment, the repair unit 404 is further configured to: for a function called by the object function, insert a call to a check function provided by the patch at a position before a return instruction in the function, the check function being used for checking whether an execution state is abnormal. The specific operation of the implementation may refer to the implementation corresponding to the embodiment of FIG. 2, which will not be repeated herein in detail.

In some optional implementations of this embodiment, the repair unit 404 is further configured to determine that the function called by the object function is a function having an execution result state as a return value before inserting the call of the check function provided by the patch. The specific operation of the implementation may refer to the implementation corresponding to the embodiment of FIG. 2, which will not be repeated herein in detail.

In some optional implementations of this embodiment, the kernel repair apparatus 400 further comprises: a verification unit configured to conduct a signature verification on the patch to determine a validity of the patch before loading the patch for repairing the to-be-repaired object function in the kernel. The specific operation of the implementation may refer to step 301 in the embodiment corresponding to FIG. 3, which will not be repeated herein in detail.

Figure 5:
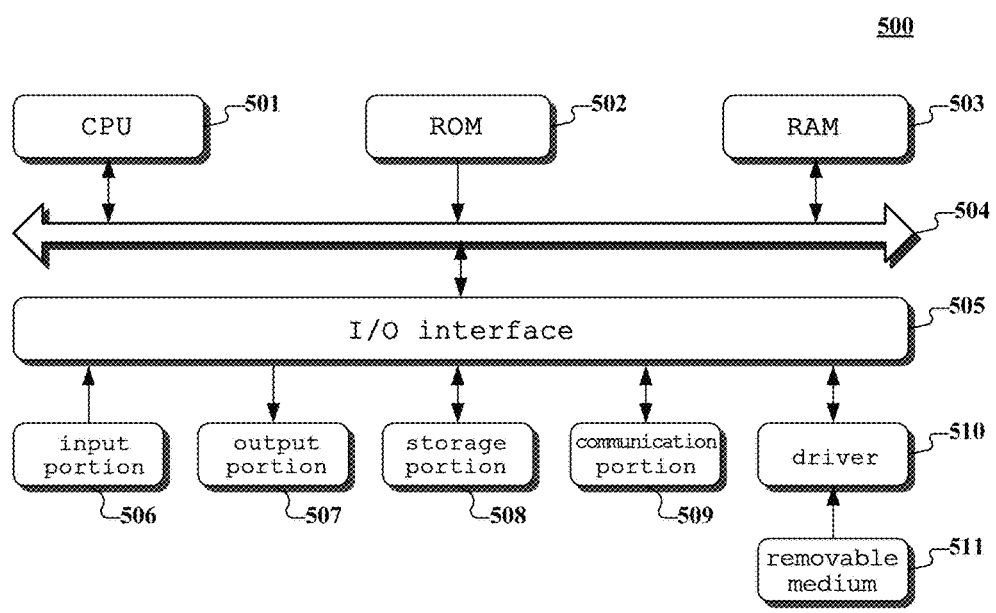
FIG. 5 is a structural schematic diagram of a computer system of a terminal device or a server suitable for implementing embodiments of this application.

Referring to FIG. 5, a schematic structural diagram of a computer system 500 adapted to implement a terminal apparatus or a server of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present disclosure. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units or modules may also be provided in a processor, for example, described as: a processor, comprising a loading unit, an execution unit, a receiving unit and a repair unit, where the names of these units or modules are not considered as a limitation to the units or modules. For example, the loading unit may also be described as "a unit for load a patch for repairing a to-be-repaired object function in a kernel".

In another aspect, the present application further provides a non-transitory computer readable storage medium. The non-transitory computer readable storage medium may be the non-transitory computer readable storage medium included in the apparatus in the above embodiments, or a stand-alone non-transitory computer readable storage medium which has not been assembled into the apparatus. The non-transitory computer readable storage medium stores one or more programs. When the one or more programs are executed by a device, the device is to: load a patch for repairing a to-be-repaired object function in a kernel, the patch being written in a memory-safe language subset of a non-memory-safe language or a memory-safe language; execute the patch using a memory-safe language engine; receive a call request for calling a repair interface to repair the object function during the executing of the patch, wherein the repair interface is an interface provided by the memory-safe language engine and used for repairing a function; and execute the requested repair interface to repair the object function.

The foregoing is only a description of the embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present disclosure with (but not limited to), technical features with similar functions.

What is claimed is:

1. A kernel repair method, comprising:
loading a patch for repairing a to-be-repaired object function in a kernel, the patch comprising a code being written in a memory-safe language subset of a non-memory-safe language or a memory-safe language;
executing the patch and limiting ability of the code of the patch within a preset range by using a memory-safe language engine;
receiving a call request for calling a repair interface to repair the object function during the execution of the patch, wherein the repair interface is an interface provided by the memory-safe language engine and used for repairing a function; and
executing the requested repair interface to repair the object function,
wherein executing the required repair interface to repair the object function comprises:
inserting a call to a check function provided by the patch at an initialization position of the object function, the check function being used for checking whether an entrance parameter of a function is abnormal.

2. The method according to claim 1, wherein the executing the requested repair interface to repair the object function further comprises:
for a function called by the object function, inserting a call to a check function provided by the patch at an initialization position of the function, the check function being used for checking whether an execution state and/or an entrance parameter of the function is abnormal.

3. The method according to claim 2, wherein before inserting the call to the check function provided by the patch, the executing the requested repair interface to repair the object function further comprises:
determining that the function called by the object function is a function including an execution result state as a return value.

4. The method according to claim 1, wherein the executing the requested repair interface to repair the object function further comprises:
for a function called by the object function, inserting a call to a check function provided by the patch at a position before a return instruction in the function, the check function being used for checking whether an execution state is abnormal.

5. The method according to claim 4, wherein before inserting the call to the check function provided by the patch, the executing the requested repair interface to repair the object function further comprises:
determining that the function called by the object function is a function including an execution result state as a return value.

6. The method according to claim 1, wherein before the loading the patch for repairing the to-be-repaired object function in the kernel, the method further comprises:
conducting a signature verification on the patch to determine a validity of the patch.

7. A non-transitory computer storage medium storing a computer program, which when executed by one or more computers, cause the one or more computers to perform operations, the operations comprising:
loading a patch for repairing a to-be-repaired object function in a kernel, the patch comprising a code being written in a memory-safe language subset of a non-memory-safe language or a memory-safe language;
executing the patch and limiting ability of the code of the patch within a preset range by using a memory-safe language engine;
receiving a call request for calling a repair interface to repair the object function during the execution of the patch, wherein the repair interface is an interface provided by the memory-safe language engine and used for repairing a function; and
executing the requested repair interface to repair the object function,
wherein executing the requested repair interface to repair the object function comprises:

inserting a call to a check function provided by the patch at an initialization position of the object function,
the check function being used for checking whether an entrance parameter of a function is abnormal.

8. The non-transitory computer storage medium according to claim 7, wherein the executing the requested repair interface to repair the object function further comprises:
for a function called by the object function, inserting a call to a check function provided by the patch at an initialization position of the function, the check function being used for checking whether an execution state and/or an entrance parameter of the function is abnormal.

9. The non-transitory computer storage medium according to claim 8, wherein before inserting the call to the check function provided by the patch, the executing the requested repair interface to repair the object function further comprises:
determining that the function called by the object function is a function including an execution result state as a return value.

10. The non-transitory computer storage medium according to claim 7, wherein the executing the requested repair interface to repair the object function further comprises:
for a function called by the object function, inserting a call to a check function provided by the patch at a position before a return instruction in the function, the check function being used for checking whether an execution state is abnormal.

11. The non-transitory computer storage medium according to claim 10, wherein before inserting the call to the check function provided by the patch, the executing the requested repair interface to repair the object function further comprises:
determining that the function called by the object function is a function including an execution result state as a return value.

12. The non-transitory computer storage medium according to claim 7, wherein before the loading a patch for repairing a to-be-repaired object function in a kernel, the method further comprises:
conducting a signature verification on the patch to determine a validity of the patch.

13. A kernel repair device, comprising:
at least one processor; and
a memory storing instructions, which when executed by the at least one processor, cause the at least one processor to perform operations, the operations comprising:
loading a patch for repairing a to-be-repaired object function in a kernel,
the patch comprising a code being written in a memory-safe language subset of a non-memory-safe language or a memory-safe language;
executing the patch and limiting ability of the code of the patch within a present range by using a memory-safe language engine;
receiving a call request for calling a repair interface to repair the object function during the execution of the patch, wherein the repair interface is an interface provided by the memory-safe language engine and used for repairing a function; and
executing the requested repair interface to repair the object function,
wherein executing the requested repair interface to repair the object function comprises:
inserting a call to a check function provided by the patch at an initialization position of the object function,
the check function being used for checking whether an entrance parameter of a function is abnormal.

14. The device according to claim 13, wherein the executing the requested repair interface to repair the object function further comprises:
for a function called by the object function, inserting a call to a check function provided by the patch at an initialization position of the function, the check function being used for checking whether an execution state and/or an entrance parameter of the function is abnormal.

15. The device according to claim 14, wherein before inserting the call to the check function provided by the patch, the executing the requested repair interface to repair the object function further comprises:
determining that the function called by the object function is a function including an execution result state as a return value.

16. The device according to claim 13, wherein the executing the requested repair interface to repair the object function further comprises:
for a function called by the object function, inserting a call to a check function provided by the patch at a position before a return instruction in the function, the check function being used for checking whether an execution state is abnormal.

17. The device according to claim 16, wherein before inserting the call to the check function provided by the patch, the executing the requested repair interface to repair the object function further comprises:
determining that the function called by the object function is a function including an execution result state as a return value.

18. The device according to claim 13, wherein before the loading a patch for repairing a to-be-repaired object function in a kernel, the method further comprises:
conducting a signature verification on the patch to determine a validity of the patch.

* * * * *